United States Patent [19]
Sakamoto et al.

[11] Patent Number: 5,731,950
[45] Date of Patent: Mar. 24, 1998

[54] MONOLITHIC CERAMIC CAPACITOR

[75] Inventors: Norihiko Sakamoto, Shiga-ken; Harunobu Sano, Kyoto; Hiroyuki Wada, Shiga-ken; Yukio Hamaji, Otsu, all of Japan

[73] Assignee: Murata Mfg. Co. Ltd., Japan

[21] Appl. No.: 769,109

[22] Filed: Dec. 18, 1996

[30] Foreign Application Priority Data

Dec. 20, 1995 [JP] Japan .................... 7-349732

[51] Int. Cl.$^6$ ............... H01G 4/06; H01G 4/008; H01G 4/005; H01G 4/228
[52] U.S. Cl. ............. 361/321.4; 361/311; 361/321.5; 361/303; 361/305; 361/308.1; 361/309; 361/313
[58] Field of Search .............. 361/311–313, 320, 361/321.1, 321.2, 321.3, 321.4, 321.5, 303–305, 306.1, 306.3, 308.1, 308.2, 309, 310; 504/134–139; 29/25.42

[56] References Cited

U.S. PATENT DOCUMENTS

| | | | |
|---|---|---|---|
| 4,987,107 | 1/1991 | Narumi et al. | 501/137 |
| 5,225,960 | 7/1993 | Kishi et al. | 29/25.42 |
| 5,337,209 | 8/1994 | Sutherland et al. | 361/321.5 |

*Primary Examiner*—Bot L. Ledynh
*Attorney, Agent, or Firm*—Ostrolenk, Faber, Gerb & Soffen, LLP

[57] ABSTRACT

Disclosed is a monolithic ceramic capacitor comprising dielectric ceramic layers made from a ceramic composition, which comprises an essential component of $(1-\alpha-\beta)\{BaO\}_m \cdot TiO_2 + \alpha\{(1-x)M_2O_3 + xRe_2O_3\} + \beta(Mn_{1-y-z}Ni_yCo_z)O$ ($0.0025 \leq \alpha \leq 0.025$; $0.0025 \leq \beta \leq 0.05$; $\beta/\alpha \leq 4$; $0 < x \leq 0.50$; $0 \leq y < 1.0$; $0 \leq z < 1.0$; $0 \leq y+z < 1.0$; $1.000 < m \leq 1.035$) and from 0.5 to mols, relative to 100 mols of the essential component, of a side component MgO, and contains from 0.2 to 3.0 parts by weight, relative to 100 parts by weight of said components, of an oxide of the type of $Li_2O-(Si,Ti)O_2-Al_2O_3-ZrO_2$. The capacitor can be small-sized while having large capacity. It can be produced even through baking in atmospheres having a low oxygen partial pressure without producing semiconductors. It has a dielectric constant of 3000 or more, and has an insulating resistance of 6000 $\Omega \cdot F$ or more, which is lowered little even in strong electric fields. It has good reliability and has a high rated voltage even when its dielectric layers are thinned, and has temperature-dependent capacitance that satisfies the B-level characteristic standard stipulated in the JIS Standard and the X7R-level characteristic standard stipulated in the EIA Standard. It has excellent weather resistance even under a load of high temperature and/or a load of high humidity.

12 Claims, 3 Drawing Sheets

MONOLITHIC CERAMIC CAPACITOR

FIELD OF THE INVENTION

The present invention relates to monolithic ceramic capacitors to be used in electronic equipment, especially those having inner electrodes made of nickel or nickel alloys.

BACKGROUND OF THE INVENTION

Monolithic ceramic capacitors comprising conventional dielectric materials that are constituted essentially of $BaTiO_3$ were problematic in that the materials are reduced into semiconductors if baked in neutral or reducing atmospheres having a low oxygen partial pressure. Therefore, it was necessary to use as inner electrodes therein, noble metals that do not melt even at temperatures at which such dielectric ceramic materials are sintered, and that are not oxidized even when baked in atmospheres having a high oxygen partial pressure in which such dielectric ceramic materials can be baked and converted into semiconductors. Accordingly, noble metals such as palladium and platinum must be used as the inner electrodes of monolithic ceramic capacitors, but this interferes with any attempt to reduce the cost of the monolithic ceramic capacitors thus produced.

In order to solve the above-mentioned problems, it has been desired to use inexpensive base metals such as nickel as the material for the inner electrodes. However, if such base metals are used as the materials of inner electrodes and if they are baked under the conventional conditions, they are oxidized and lose their function as electrodes. Therefore, in order to successfully use such base metals as inner electrodes, monolithic ceramic capacitors having satisfactory relative resistivity and excellent dielectric characteristics have been desired that can be baked even in neutral or reducing atmospheres having a low oxygen partial pressure without making the ceramic materials therein into semiconductors. As materials that meet such requirements, proposed were compositions of the type of $BaTiO_3$—$CaZrO_3$—$MnO$—$MgO$, such as those disclosed in Japanese Patent Application Laid-Open No. 62-256422; compositions of the type of $BaTiO_3$—$MnO$—$MgO$-rare earth oxide, such as those in Japanese Patent Application Laid-Open No. 63-103861; and compositions of the type of $BaTiO_3$—$(Mg, Zn,Sr,Ca)O$—$Li_2O$—$SiO_2$—$MO$ ($MO:BaO$, $SrO$, $CaO$), such as those in Japanese Patent Publication No. 61-14610.

However, in the non-reducible, dielectric ceramic compositions disclosed in Japanese Patent Application Laid-Open No. 62-256422, $CaZrO_3$ and also $CaTiO_3$ that may be formed during the baking step often give heterogeneous phases with Mn and others, which lowers the reliability of the capacitors at high temperatures.

In the non-reducible, dielectric ceramic compositions disclosed in Japanese Patent Application No. 63-103861, the grain sizes of the crystals of the essential component, $BaTiO_3$ have a great influence on the insulating resistance and the temperature-dependent capacity of the capacitors. Using the compositions, therefore, it is difficult to control the grain sizes of the crystals in order to obtain capacitors with stable characteristics. Moreover, the insulating resistance in terms of its product with the capacitance (product CR) of the capacitors disclosed is from 1000 to 2000 ($\Omega \cdot F$), which is hardly within the practicable range.

The non-reducible, dielectric ceramic compositions disclosed in Japanese Patent Publication No. 61-14610 give dielectric layers having a dielectric constant of from 2000 to 2800, which is lower than that of from 3000 to 3500 in the conventional, dielectric ceramic compositions combined with noble metals such as Pd. Therefore, if the compositions disclosed are directly substituted for the conventional materials in order to reduce the cost of the capacitors, such is disadvantageous and problematic in the viewpoint of the desired small-sized, large-capacity capacitors.

In addition, the dielectric layers to be produced from the non-reducible, dielectric ceramic compositions previously proposed tended to have noticeably lowered resistance values at high temperatures, even though having high insulating resistance at room temperature. Since this tendency was great especially in strong electric fields, it was a great bar to the production of thin dielectric layers. For these reasons, monolithic ceramic capacitors having thin dielectric layers made from such non-reducible, dielectric ceramic compositions have not heretofore been put to practical use. In addition, the non-reducible, dielectric ceramic compositions were defective in that their reliability in high-temperature and high-humidity conditions (that is, the moisture-resistant load characteristic) was lower than that of the conventional materials combined with inner electrodes of Pd or the like.

In order to solve the above-mentioned problems, we, the present inventors have already proposed novel, non-reducible, dielectric ceramic compositions such as those in Japanese Patent Application Laid-Open Nos. 05-009066 to 05-009068. In today's market, however, capacitors having much better characteristics, especially those in high-temperature and high-humidity conditions are required. Therefore, it has become necessary to propose dielectric ceramic compositions with much better characteristics.

SUMMARY OF THE INVENTION

Accordingly, the object of the present invention is to provide a small-sized, large-capacity, monolithic ceramic capacitor, which can be produced even through baking in atmospheres having a low oxygen partial pressure without producing semiconductors, which has a dielectric constant of 3000 or more, which has an insulating resistance of 6000 $\Omega \cdot F$ or more in terms of its product with the capacitance (the product CR), of which the insulating resistance is lowered at most slightly even in strong electric fields, which has good reliability and has a high rated voltage even when the dielectric layers thereof are thinned, which has temperature-dependent capacitance that satisfies the B-level characteristic standard stipulated in the JIS Standard and the X7R-level characteristic standard stipulated in the EIA Standard, and which has excellent weather resistance even under a load of high temperature and/or a load of high humidity.

Specifically, the present invention provides a monolithic ceramic capacitor composed of a plurality of dielectric ceramic layers, a plurality of inner electrodes formed between the dielectric ceramic layers in such a manner that one end of each inner electrode is exposed out of a end of the dielectric ceramic layers, preferably alternating ends, and outer electrodes electrically connected with the exposed inner electrodes, which is characterized in that the dielectric ceramic layers each are made of a material comprising barium titanate having a content of alkali metal oxide impurities of about 0.02% by weight or less, and also yttrium oxide, gadolinium oxide, terbium oxide, dysprosium oxide, manganese oxide, cobalt oxide and nickel oxide, and containing a side component, magnesium oxide in an amount of from about 0.5 to 5.0 mols, in terms of MgO, relative to 100 mols of an essential component having the following compositional formula:

$(1-\alpha-\beta)\{BaO\}_m \cdot TiO_2 + \alpha\{(1-x)M_2O_3 + xRe_2O_3\} + \beta(Mn_{1-y-z}Ni_yCo_z)O$ where Re$_2$O$_3$ is one or more selected from Gd$_2$O$_3$, Tb$_2$O$_3$ and Dy$_2$O$_3$;

M$_2$O$_3$ is one or more selected from Y$_2$O$_3$ and Sc$_2$O$_3$; and

α, β, m, x, y and z are as follows:

0.0025≦α≦0.025
 0.0025≦β≦0.05
 β/α≦4
 0<x≦0.50
 0≦y<1.0
 0≦z<1.0
 0≦y+z<1.0
 1.000<m≦1.035.

and further containing from 0.2 to 3.0 parts by weight, relative to 100 parts by weight of said components, of an oxide of the type of Li$_2$O—(Si,Ti)O$_2$—Al$_2$O$_3$—ZrO$_2$; and the inner electrodes are made of nickel or a nickel alloy.

Preferably, the Li$_2$O—(Si,Ti)O$_2$—Al$_2$O$_3$—ZrO$_2$ oxide falls within a compositional range as surrounded by six lines formed by connecting six points representing the mol % of:

A (20, 80, 0)
 B (10, 80, 10)
 C (10, 70, 20)
 D (35, 45, 20)
 E (45, 45, 10)
 F (45, 55, 0)

in a triangular diagram of {Li$_2$O, (Si$_w$Ti$_{1-w}$)O$_2$, M}, in which 0.30≦w≦1.0, and M is at least one selected from Al$_2$O$_3$ and ZrO$_2$, and provided that w<1.0 for the composition on the line A–F.

Preferably, the impurities are less than about 0.015%, 0.004≦α≦0.02, 0.009≦β≦0.04, β/α≦2, x is abut 0.1–0.4, y is about 0.1–0.8, z is about 0.3–0.8, y+z is about 0.3–0.8, m is about 1.01–1.035, 0.4≦w≦0.9, said Li$_2$O—(Si,Ti)O$_2$—Al$_2$O$_3$—ZrO$_2$ oxide is about 0.8–2 parts, and the grain size is less that about 1 micron and most preferable less than about 0.075 micron.

Also preferably, the outer electrodes each are made of a sintered layer of an electroconductive metal powder or of an electroconductive metal powder with glass frit added thereto. Still preferably, the outer electrodes each are composed of a first, sintered layer of an electroconductive metal powder or of an electroconductive metal powder with glass frit added thereto, and a second, plated layer formed on the first layer.

The monolithic ceramic capacitor of the present invention is advantageous in that it can be produced even through baking in neutral or reducing atmospheres at temperatures falling between 1260° C. and 1300° C., and has an insulating resistance of 6000 Ω·F or more in terms of its product with the capacitance (the product CR), that its insulating resistance is lowered little even in strong electric fields, that it has good reliability and has a high rated voltage even when its dielectric layers are thinned, that it has a high dielectric constant of 3000 or more, that it has temperature-dependent capacitance which satisfies the B-level characteristic standard stipulated in the JIS Standard and the X7R-level characteristic standard stipulated in the EIA Standard, and that its characteristics are not worsened even in high-temperature and high-humidity conditions Accordingly, the monolithic ceramic capacitor of the present invention can have inner electrodes of nickel or an nickel alloy. Therefore, according to the present invention, it is possible to significantly reduce the cost of the monolithic ceramic capacitors of the invention without worsening all their characteristics including the weather resistance such as high-temperature load resistance and high-humidity load resistance, as compared with the conventional, monolithic ceramic capacitors comprising noble metals such as Pd.

The above-mentioned object and the other objects of the present invention, and also the characteristics and the advantages thereof will be clarified further more in the detailed description of the preferred modes of carrying out the invention and the examples of the invention, which is made hereinunder with reference to the drawings attached hereto.

PREFERRED MODES OF CARRYING OUT THE INVENTION

Figure 1:
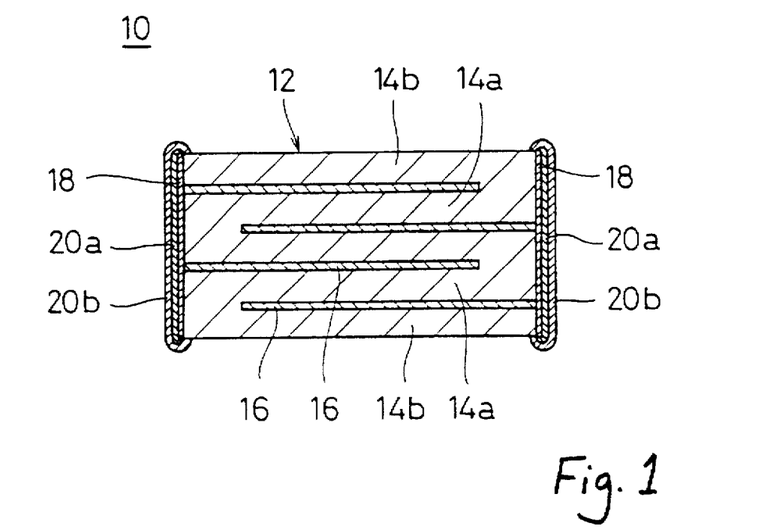
FIG. 1 is a cross-sectional view illustrating one embodiment of the present invention.

FIG. 1 is a cross-sectional view showing one embodiment of the present invention. The monolithic ceramic capacitor 10 illustrated comprises a monolithic dielectric ceramic body 12. The monolithic dielectric ceramic body 12 is formed by integrally laminating a plurality of first dielectric ceramic layers 14a and two second dielectric ceramic layers 14b. In the monolithic dielectric ceramic body 12, the dielectric ceramic layers 14a and 14b are integrally laminated in such a manner that the two dielectric ceramic layers 14b are disposed at the both sides, while sandwiching therebetween a plurality of the first dielectric ceramic layers 14a. These dielectric ceramic layers 14a and 14b are laminated along with inner electrodes 16 alternately embedded therein. On each of both sides of the monolithic dielectric ceramic body 12, formed are an outer electrode 18, a first plate film 20a and a second plate film 20b in that order. The first plate film 20a may be made of nickel or copper, and the second plate film 20b may be made of solder or tin. Accordingly, the monolithic ceramic capacitor 10 is shaped in the form of a rectangular parallelepiped chip.

Now, a method for producing the monolithic ceramic capacitor 10 of the invention is described below in the order of the steps constituting the method.

Figure 2:
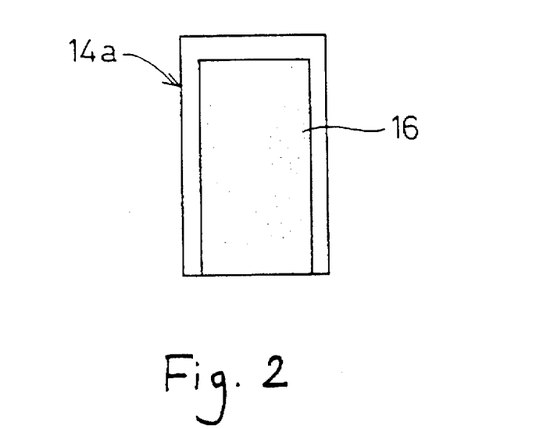
FIG. 2 is a plan View illustrating one embodiment of the first dielectric ceramic layer to be laminated.
Figure 3:
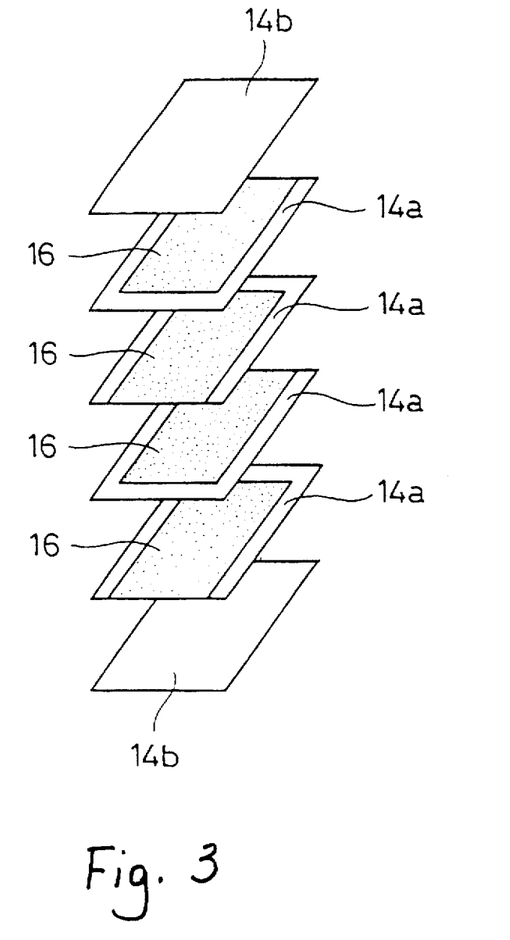
FIG. 3 is a perspective, exploded view illustrating the lamination of first dielectric ceramic layers and second dielectric ceramic layers to construct the monolithic dielectric ceramic body to be in the capacitor of the invention.

First, the monolithic dielectric ceramic body 12 is produced as follows. As in FIG. 2, a raw material powder comprising barium titanate, yttrium oxide, gadolinium oxide, terbium oxide, dysprosium oxide, manganese oxide, cobalt oxide, nickel oxide, magnesium oxide, and an oxide glass consisting essentially of Li$_2$O—(TiO$_2$,SiO$_2$)—Al$_2$O$_3$ is formed into a slurry, and then sheeted to prepare a first, dielectric ceramic layer 14a (green sheet). On one surface of the green sheet, formed is an internal electrode 16 of nickel or a nickel alloy. To form the internal electrode 16, employable is any method of screen printing, metal vapor deposition or plating. A predetermined number of the first dielectric ceramic layers 14a each with the inner electrode 16 formed thereon are laminated together, and then sandwiched between two dielectric ceramic layers 14b with no inner electrode 16, as in FIG. 3, and these are integrated under pressure to give a monolithic laminate. Next, the resulting laminate is baked in a reducing atmosphere at a predetermined temperature to obtain a monolithic dielectric ceramic body 12.

Next, on both sides of the monolithic dielectric ceramic body 12, formed are two outer electrodes 18 that are connected with the inner electrodes 16. The material of the outer electrodes 18 may be the same as that of the inner electrodes 16. Apart from this, silver, palladium, silver-palladium alloys and others can be used as the material of the outer electrodes 18. In consideration of the use of the monolithic ceramic capacitor 10 and the site at which the capacitor 10 is used, suitable materials are selected for the outer electrodes 18. The outer electrodes 18 can be formed by applying a paste material of metal powder onto the baked, monolithic dielectric ceramic body 12 followed by baking. Alternatively, the paste material can be applied onto the non-baked body 12, and the composite is thereafter baked. After this, the outer electrodes 18 may be plated with nickel, copper or the like to form a first plate film 20a thereon. Last, the first plate film 20a is coated with a second plate film 20b of solder, tin or the like. Thus is produced the chip-type, monolithic ceramic capacitor 10 of the invention.

EMBODIMENTS OF THE INVENTION

Example 1

First, raw materials of $TiCl_4$ and $Ba(NO_3)_2$ having various degrees of purity were prepared and weighed. These were treated with oxalic acid to obtain a precipitate of barium titanyl oxalate $(BaTiO(C_2O_4).4H_2O)$. This precipitate was decomposed under heat of 1000° C. or higher to obtain the four types of barium titanate $(BaTiO_3)$ shown in Table 1. On the other hand, oxides, carbonates and hydroxides of the constitutive components were weighed to give a composition of $0.25Li_2O$—$0.65(0.30TiO_2.0.70SiO_2)$—$0.10Al_2O_3$ (by mol), then mixed, ground, and vaporized to dryness to obtain a powder. This powder was melted under heat at 1300° C. in an alumina crucible, and then rapidly cooled to obtain a oxide glass having a mean grain size of 1 μm or less.

TABLE 1

| Type of $BaTiO^3$ | Content of Impurities (wt. %) | | | | | Mean Grain Size (μm) |
|---|---|---|---|---|---|---|
| | Alkali Metal Oxides | SrO | CaO | $SiO^2$ | $Al_2O_3$ | |
| A | 0.003 | 0.012 | 0.001 | 0.010 | 0.005 | 0.60 |
| B | 0.020 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

Next, prepared were $BaCO_3$, which is to adjust the molar ratio, m, of Ba/Ti in the barium titanate, and $Sc_2O_3$, $Y_2O_3$, $Gd_2O_3$, $Tb_2O_3$, $Dy_2O_3$, $MnCO_3$, NiO, $Co_2O_3$ and MgO each having a purity of 99% or more. Powders of these raw materials were mixed with the oxide glass at various compositional ratios as shown in Table 2 to prepare various compositions. Each composition was wet-milled in a ball mill along with a polyvinyl butyral binder and an organic solvent such as ethanol to obtain a ceramic slurry. This ceramic slurry was sheeted according to the doctor blade method to obtain a rectangular, ceramic green sheet having a thickness of 14 μm. Next, an electroconductive paste consisting essentially of Ni was printed on this ceramic green sheet to form an electroconductive paste layer thereon in the form of an inner electrode.

TABLE 2

$(1-\alpha-\beta)(BaO)_m TiO_2 + \alpha\{(1-x)M_2O_3 + xRe_2O_3\} + \beta(Mn_{1-y}Ni_yCO_2)O$

| Sample No. | Type of $BaTiO_2$ | σ | M | | | Re | | | x | β | β/α | y | z | y+z | m | MgO | Amount of Oxide Glass Added (wt. pts.) |
|---|---|---|---|---|---|---|---|---|---|---|---|---|---|---|---|---|---|
| | | | Sc | Y | 1−x | Gd | Tb | Dy | | | | | | | | | |
| *1 | A | 0.0000 | — | — | — | — | — | — | — | 0.0200 | — | 0.20 | 0.20 | 0.40 | 1.010 | 1.00 | 0.80 |
| *2 | A | 0.0100 | — | 0.60 | 0.60 | — | 0.40 | — | 0.40 | 0.0000 | 0 | — | — | — | 1.010 | 1.00 | 0.50 |
| *3 | A | 0.0150 | — | 1.00 | 1.00 | — | — | — | 0.00 | 0.0450 | 3 | 0.20 | 0.20 | 0.40 | 1.010 | 1.00 | 0.50 |
| *4 | A | 0.0100 | 0.20 | 0.60 | 0.80 | — | — | 0.20 | 0.20 | 0.0200 | 2 | 0.30 | 0.20 | 0.50 | 0.990 | 1.00 | 0.50 |
| *5 | A | 0.0200 | 0.20 | 0.70 | 0.90 | — | 0.10 | — | 0.10 | 0.0200 | 1 | 0.30 | 0.30 | 0.60 | 1.000 | 1.50 | 0.80 |
| *6 | A | 0.0100 | — | 0.70 | 0.70 | — | — | 0.30 | 0.30 | 0.0300 | 3 | 0.20 | 0.20 | 0.40 | 1.010 | 0.30 | 0.80 |
| *7 | A | 0.0100 | — | 0.80 | 0.80 | — | — | 0.20 | 0.20 | 0.0100 | 1 | 0.10 | 0.30 | 0.40 | 1.010 | 1.00 | 0.00 |
| 8 | A | 0.0025 | — | 0.80 | 0.80 | — | — | 0.20 | 0.20 | 0.0025 | 1 | 0.20 | 0.50 | 0.70 | 1.010 | 1.5 | 0.20 |
| 9 | A | 0.0250 | 0.20 | 0.70 | 0.90 | — | — | 0.10 | 0.10 | 0.0500 | 2 | 0.20 | 0.20 | 0.40 | 1.005 | 0.60 | 0.80 |
| 10 | A | 0.0060 | — | 0.70 | 0.70 | — | 0.30 | — | 0.30 | 0.0240 | 4 | 0.30 | 0.20 | 0.50 | 1.015 | 1.50 | 1.00 |
| 11 | A | 0.0100 | — | 0.50 | 0.50 | — | 0.50 | — | 0.50 | 0.0025 | 0.25 | 0.10 | 0.50 | 0.60 | 1.005 | 2.50 | 0.50 |
| 12 | A | 0.0060 | 0.60 | — | 0.60 | 0.40 | — | — | 0.40 | 0.0090 | 1.5 | 0.80 | 0.00 | 0.80 | 1.010 | 1.50 | 1.20 |
| 13 | B | 0.0100 | — | 0.90 | 0.90 | 0.10 | — | — | 0.10 | 0.0200 | 2 | 0.00 | 0.80 | 0.80 | 1.010 | 1.20 | 0.80 |
| 14 | A | 0.0040 | — | 0.80 | 0.80 | 0.10 | — | 0.10 | 0.20 | 0.0080 | 2 | 0.20 | 0.10 | 0.30 | 1.010 | 5.00 | 1.00 |
| 15 | C | 0.0150 | — | 0.70 | 0.70 | — | 0.20 | 0.10 | 0.30 | 0.0300 | 2 | 0.00 | 0.00 | 0.00 | 1.035 | 0.50 | 1.00 |
| 16 | A | 0.0200 | — | 0.70 | 0.70 | 0.10 | 0.10 | 0.10 | 0.30 | 0.0400 | 2 | 0.30 | 0.00 | 0.30 | 1.035 | 1.50 | 3.00 |
| *17 | A | 0.0300 | — | 0.80 | 0.80 | — | — | 0.20 | 0.20 | 0.0300 | 1 | 0.20 | 0.10 | 0.30 | 1.020 | 2.00 | 1.50 |
| *18 | A | 0.0200 | — | 0.70 | 0.70 | — | — | 0.30 | 0.30 | 0.0700 | 3.5 | 0.10 | 0.20 | 0.30 | 1.010 | 1.00 | 1.00 |
| *19 | A | 0.0100 | 0.20 | 0.60 | 0.80 | — | 0.20 | — | 0.20 | 0.0500 | 5 | 0.30 | 0.10 | 0.40 | 1.010 | 1.00 | 0.80 |
| *20 | A | 0.0200 | — | 0.30 | 0.30 | 0.70 | — | — | 0.70 | 0.0400 | 2 | 0.20 | 0.10 | 0.30 | 1.010 | 1.00 | 0.80 |
| *21 | A | 0.0100 | — | 0.80 | 0.80 | — | — | 0.20 | 0.20 | 0.0100 | 1 | 1.00 | 0.00 | 1.00 | 1.010 | 1.20 | 0.80 |
| *22 | A | 0.0050 | — | 0.70 | 0.70 | — | — | 0.30 | 0.30 | 0.0100 | 2 | 0.00 | 1.00 | 1.00 | 1.020 | 1.00 | 0.80 |
| *23 | A | 0.0050 | 0.20 | 0.60 | 0.80 | 0.20 | — | — | 0.20 | 0.0100 | 2 | 0.50 | 0.50 | 1.00 | 1.030 | 1.00 | 0.80 |
| *24 | A | 0.0050 | — | 0.70 | 0.70 | 0.30 | — | — | 0.30 | 0.0100 | 2 | 0.10 | 0.10 | 0.20 | 1.050 | 1.00 | 0.80 |
| *25 | A | 0.0050 | 0.2 | 0.70 | 0.90 | — | — | 0.10 | 0.10 | 0.0100 | 2 | 0.10 | 0.10 | 0.20 | 1.010 | 7.00 | 0.80 |
| *26 | A | 0.0160 | — | 0.70 | 0.70 | — | — | 0.30 | 0.30 | 0.0040 | 0.25 | 0.20 | 0.20 | 0.40 | 0.010 | 1.00 | 5.00 |
| *27 | D | 0.0100 | — | 0.60 | 0.60 | — | — | 0.40 | 0.40 | 0.0300 | 3 | 0.30 | 0.10 | 0.40 | 1.015 | 1.50 | 1.00 |

A plurality of these ceramic green sheets each having the electroconductive paste layer formed thereon were laminated in such a manner that the side of one sheet with the electroconductive paste exposed out of it was alternated with that of another sheet with the electroconductive paste not exposed out of it. Thus was obtained a laminate. This laminate was heated in an $N_2$ atmosphere at 350° C. whereby the binder was burnt out, and then baked for 2 hours in a reducing atmosphere comprising gases of $H_2$, $N_2$ and $H_2O$ and having an oxygen partial pressure of from $10^{-12}$ to $10^{-9}$ MPa, at various temperatures shown in Table 3, to obtain sintered ceramic bodies. A silver paste was applied onto the both sides of each sintered ceramic body, and baked in an $N_2$ atmosphere at 600° C. to thereby form outer electrodes as electrically connected with the inner electrodes.

The outer dimensions of each of these monolithic capacitors thus obtained was 1.6 mm width×3.2 mm length×1.2 mm thickness, and the thickness of each dielectric ceramic layer sandwiched between the inner electrodes was 8 μm. The total number of the effective dielectric ceramic layers was 19, and the area of the facing electrodes per ceramic layer was 2.1 mm².

The capacitance (C) and the dielectric loss (tan δ) of each of the thus-produced capacitor sample were measured using an automatic bridge-type meter at a frequency of 1 KHz, at 1 V rms and at 25° C. From the capacitance thus measured, obtained was the dielectric constant (ε) of each sample through calculation. Next, to measure the insulating resistance (R) of each sample, a direct current voltage of 16 V or 160 V was applied to each sample at 25° C. or 125° C. for 2 minutes using an insulating resistance meter. After having thus measured the insulating resistance (R) of each sample, the product of the capacitance (C) and the insulating resistance (R) or, that is, the product CR, of each sample was obtained. In addition, the temperature-dependent variation in the capacitance of each sample was determined.

For the temperature-dependent variation in the capacitance, obtained were the variation in the capacitance between −25° C. and 85° C. based on the capacitance at 20° C. ($\Delta C/C_{20}$), the variation in the capacitance between −55° C. and 125° C. based on the capacitance at 25° C. ($\Delta C/C_{25}$), and the maximum variation, in terms of the absolute value, between −55° C. and 125° C. ($|\Delta C|max$).

To determine the high-temperature load life of each sample, 36 pieces of each sample were subjected to a high-temperature load test in which a direct current voltage of 100 V was applied to each piece at 150° C. while measuring the insulating resistance of each test piece which varied time-dependently. In this test, the period of time within which the insulating resistance value (R) of each piece being tested reached $10^6$ Ω or lower was measured, and is referred to as the life time of each test piece. The average of all the tested pieces was calculated to obtain the average life time of each sample. To determine the high-humidity load life of each sample, 72 pieces of each sample were subjected to a high-humidity load test in which a direct current voltage of 16 V was applied to each piece under a pressure of 2 atmospheres at a relative humidity of 100% and at a temperature of 121° C. while measuring the insulating resistance of each test piece which varied time-dependently. In this test, the number of the tested pieces that showed an insulating resistance (R) of $10^6$ Ω or lower within a period of 250 hours was counted.

The results obtained in these tests are shown in Table 3.

As is obvious from Table 1, Table 2 and Table 3, the monolithic capacitor samples falling within the scope of the present invention were all found to have a high dielectric constant of not lower than 3,000, and have a dielectric loss tangent, tan δ, of not larger than 2.5%, while satisfying the B-level characteristic standard stipulated in the JIS Standard within the temperature range between −25° C. and 85° C.

TABLE 3

| Sample No. | Baking Temperature [°C.] | Dielectric Constant ε | Dielectric Loss tan δ % | Temperature-Dependent Variation in Capacitance $\Delta C/C_{20}$ % −25° C. | 85° C. | Temperature-Dependent Variation in Capacitance $\Delta C/C_{25}$ % −55° C. | 125° C. | max | Product CR (25° C.) (Ω · F) 16 V | 160 V | Product CR (125° C.) (Ω · F) 16 V | 160 V | Mean Life Time (hr.) | Number of Failures in high-humidity Load Test |
|---|---|---|---|---|---|---|---|---|---|---|---|---|---|---|
| *1 | 1280 | 2830 | 3.1 | −4.8 | 18.0 | −10.6 | 13.2 | 25.3 | 6100 | 2030 | 2140 | 510 | 52 | 0/72 |
| *2 | 1300 | As Semiconductors were formed, the measurement was impossible |
| *3 | 1280 | 3360 | 2.0 | 0.1 | −7.5 | −0.4 | −8.9 | 8.9 | 6980 | 2970 | 2740 | 710 | 352 | 0/72 |
| *4 | 1280 | As Semiconductors were formed, the measurement was impossible |
| *5 | 1280 | 3280 | 2.2 | −0.1 | 9.5 | −0.5 | −10.5 | 10.5 | 4500 | 690 | 1520 | 350 | 229 | 0/72 |
| *6 | 1280 | 3510 | 2.3 | 1.4 | −14.6 | 1.1 | −17.9 | 19.3 | 4100 | 1510 | 1480 | 390 | 235 | 0/72 |
| *7 | 1350 | As the sample was sintered insufficiently, the measurement was impossible |
| 8 | 1280 | 3310 | 2.0 | 0.3 | −10.0 | −0.5 | −11.2 | 12.0 | 7250 | 2900 | 2540 | 660 | 575 | 0/72 |
| 9 | 1280 | 3180 | 1.8 | 0.3 | −8.3 | −0.5 | −9.5 | 9.6 | 6230 | 2500 | 2180 | 570 | 669 | 0/72 |
| 10 | 1300 | 3250 | 1.6 | 0.5 | −9.1 | −0.3 | −10.3 | 10.5 | 7530 | 3010 | 2640 | 690 | 653 | 0/72 |
| 11 | 1300 | 3020 | 1.5 | −0.3 | −7.3 | −1.1 | −8.5 | 8.5 | 6800 | 2720 | 2380 | 620 | 613 | 0/72 |
| 12 | 1280 | 3290 | 1.8 | 0.2 | −8.6 | −0.6 | −9.3 | 9.6 | 6280 | 2510 | 2200 | 670 | 663 | 0/72 |
| 13 | 1300 | 3100 | 1.6 | 0.1 | −7.3 | −0.7 | −8.5 | 8.5 | 7840 | 3140 | 2740 | 710 | 631 | 0/72 |
| 14 | 1280 | 3150 | 1.7 | −0.7 | −6.3 | −1.5 | −7.5 | 8.0 | 6530 | 2610 | 2290 | 590 | 638 | 0/72 |
| 15 | 1300 | 3260 | 1.9 | −0.2 | −8.4 | −1.0 | −9.4 | 9.5 | 6910 | 2760 | 2420 | 630 | 603 | 0/72 |
| 16 | 1280 | 3350 | 1.5 | 1.1 | −6.8 | 0.3 | −12.3 | 12.5 | 7330 | 2930 | 2570 | 670 | 568 | 0/72 |
| *17 | 1350 | 2230 | 1.9 | 0.0 | −7.4 | −0.8 | −8.6 | 8.6 | 4920 | 1600 | 1510 | 380 | 264 | 0/72 |
| *18 | 1300 | 3030 | 2.0 | 0.3 | −8.3 | −0.5 | −9.1 | 9.1 | 6100 | 1850 | 1630 | 460 | 363 | 0/72 |
| *19 | 1280 | 3520 | 2.1 | 1.5 | −12.5 | 1.2 | −18.9 | 20.1 | 6020 | 2130 | 2030 | 530 | 531 | 0/72 |
| *20 | 1300 | 3290 | 1.9 | 1.3 | −15.4 | 0.9 | −17.3 | 18.1 | 6840 | 2210 | 2310 | 590 | 611 | 0/72 |
| *21 | 1300 | 3260 | 1.8 | 0.2 | −9.6 | −0.2 | −11.6 | 12.0 | 4630 | 1350 | 1210 | 360 | 210 | 0/72 |
| *22 | 1300 | 3180 | 1.6 | −0.2 | −7.8 | −1.0 | −8.9 | 8.9 | 4860 | 1210 | 1060 | 330 | 236 | 0/72 |
| *23 | 1300 | 3320 | 2.1 | 1.2 | −10.0 | 0.5 | −12.5 | 12.8 | 3950 | 1180 | 990 | 280 | 185 | 0/72 |
| *24 | 1350 | As the sample was sintered insufficiently, the measurement was impossible |
| *25 | 1350 | 2670 | 1.3 | −0.5 | −6.4 | −1.4 | −7.6 | 7.6 | 5100 | 1690 | 1420 | 410 | 523 | 18/72 |
| *26 | 1260 | 2110 | 1.8 | 1.2 | −12.6 | 0.9 | −18.5 | 18.9 | 7020 | 2540 | 2360 | 560 | 567 | 0/72 |
| *26 | 1280 | 2470 | 1.7 | 0.6 | −5.1 | 0.5 | −6.3 | 6.3 | 6950 | 2650 | 2320 | 540 | 506 | 0/72 |

Samples with * are outside the invention and also the X7R-level characteristic standard stipulated in the EIA Standard within the temperature range between −55° C. and 125° C. with respect to the temperature-dependent variation in the capacitance.

Moreover, these samples of the invention were found to have high insulating resistance values when measured at 25° C. and at 16 V and 160 V of not smaller than 6,000 Ω·F and not smaller than 2,000 Ω·F, respectively, in terms of the product CR. These also had high insulating resistance values when measured at 125° C. and at 16 V and 160 V of not smaller than 2,000 Ω·F and not smaller than 500 Ω·F, respectively, in terms of the product CR. Further, these were found to have a long mean life time of not shorter than 500 hours, and in addition, no failure was found in the high-humidity load test. Moreover, these were sintered at relatively low temperatures of not higher than 1300° C.

The reasons for defining the compositions for use in the present invention are mentioned below.

First referred to are the reasons for defining the composition of $(1-\alpha-\beta)\{BaO\}_m \cdot TiO_2 + \alpha\{(1-x)M_2O_3 + xRe_2O_3\} + \beta(Mn_{1-y-z}Ni_yCo_z)O$, in which $Re_2O_3$ is one or more of $Gd_2O_3$, $Tb_2O_3$ and $Dy_2O_3$, and $M_2O_3$ is one or more of $Sc_2O_3$ and $Y_2O_3$.

As shown in Sample No. 1, if the amount α of $(M_2O_3 + xRe_2O_3)$ is smaller than 0.0025, such is unfavorable since the dielectric constant ε is lower than 3,000, the dielectric loss tangent, tan δ, is larger than 2.5%, the temperature-dependent variation in the capacitance is great, and the mean life time is very short. As seen in Sample No. 17, if the amount α of $(M_2O_3 + xRe_2O_3)$ is larger than 0.025, such is also unfavorable since the dielectric constant is not larger than 3,000, the insulating resistance is low, the mean life time is short, the sintering temperature is high, and the high-moisture load test gave some failures.

If the amount β of (Mn,Ni,Co)O is smaller than 0.0025 as in Sample No. 2, such is unfavorable since the constitutive ceramics were reduced into semiconductors when baked in the reducing atmosphere, to thereby lower the insulating resistance. Sample No. 18 shows that if the amount β of (Mn,Ni,Co)O is larger than 0.05, such is also unfavorable since the insulating resistance at 160 V and at 125° C. is low, and the mean life time is shorter than 500 hours. As illustrated by Sample Nos. 21, 22 and 23, if the Mn content is zero, such is unfavorable since the insulating resistance is low and the mean life time is shorter than 500 hours.

As seen in Sample No. 3, if the value of x in {(1−x) M₂O₃+xRe₂O₃} is 0 (zero), such is unfavorable since the mean life time is shorter than 500 hours. Sample No. 20 shows that if the value of x is more than 0.5, such is also unfavorable since the temperature-dependent variation in the capacitance is large, and the capacitor could satisfy neither the B-level characteristic standard of the JIS Standard nor the X7R-level characteristic standard of the EIA Standard.

As apparant from Sample No. 19, if the ratio β/α of the amount B of (Mn,Ni,Co)O to the amount α of $(M_2O_3 + Re_2O_3)$ is larger than 4, such is unfavorable since the temperature-dependent variation in the capacitance is large.

In Sample Nos. 4 and 5, the molar ratio m is not larger than 1.000, and such is unfavorable since some components constituting the capacitor are converted into semiconductors, the insulating resistance is low, and the mean life time is shorter than 500 hours. In Sample No. 24, the molar ratio m is larger than 1.035, and such is also unfavorable since the capacitor could not be sintered even at 1350° C.

As shown in Sample No. 6, if the amount of MgO is smaller than 0.5 mols, such is unfavorable, since the insulating resistance (in terms of the product CR) could not be over 2000 Ω·F at 160 V, the mean life time is shorter than 500 hours, and the temperature-dependent variation in the capacitance could satisfy neither the B-level characteristic standard of the JIS Standard nor the X7R-level characteristic standard of the EIA standard. As awwn in Sample No. 25, if the amount of MgO is larger than 5.0 mols, such is also unfavorable since the sintering temperature is too high, the dielectric constant could not be over 3,000, the insulating resistance is low, and the high-moisture load test gave some failures.

As seen in Sample No. 7, if the amount of the oxide glass is smaller than about 0.2 parts by weight, such is unfavorable since the capacitor could not be sintered even at 1350° C. If the amount of the oxide glass is larger than 3.0 parts by weight, as in Sample No. 26, such is also unfavorable since the dielectric constant is low, and the temperature-dependent variation in the capacitance is large.

If the content of alkali metal oxide impurities in barium titanate is larger than about 0.02% by weight, as in Sample No. 27, such is unfavorable since the dielectric constant is low.

Example 2

Using barium titanate A of Table 1, prepared was a raw material powder to give a dielectric composition of $97.0\{BaO\}_{1.010} \cdot TiO_2 + 0.7Y_2O_3 + 0.3Dy_2O_3 + 0.6MnO + 0.7NiO + 0.7CoO$ (by mol) containing 1.2 mols of MgO. To this was added one of the oxide glass samples having a mean grain size of 1 μm or less, which had been prepared in the same manner as in Example 1 and shown in Table 4. Using these, prepared were monolithic ceramic capacitors each having outer electrodes of silver as electrically connected with inner electrodes, in the same manner as in Example 1. The temperature at which glass was heated and melted was varied within the range between 1200° C. and 1500° C., depending on the glass compositions. The outer dimensions of the monolithic ceramic capacitor samples produced herein was the same as those in Example 1.

TABLE 4

| Sample No. | Amount Glass Added (wt. %) | Components of Oxide Glass | | | | |
|---|---|---|---|---|---|---|
| | | Li₂O | (Si₂Ti₁₋ₓ) | W | Al₂O₃ | ZrO₂ |
| 101 | 1.00 | 20 | 80 | 0.3 | 0 | 0 |
| 102 | 1.00 | 10 | 80 | 0.6 | 5 | 5 |
| 103 | 0.80 | 10 | 70 | 0.5 | 20 | 0 |
| 104 | 0.80 | 35 | 45 | 1.0 | 10 | 10 |
| 105 | 1.50 | 45 | 45 | 0.5 | 10 | 0 |
| 106 | 1.50 | 45 | 55 | 0.3 | 0 | 0 |
| 107 | 1.00 | 20 | 70 | 0.6 | 5 | 5 |
| 108 | 1.00 | 20 | 70 | 0.4 | 10 | 0 |
| 109 | 1.20 | 30 | 60 | 0.7 | 5 | 5 |
| 110 | 1.20 | 30 | 60 | 0.8 | 10 | 0 |
| 111 | 2.00 | 40 | 50 | 0.6 | 5 | 5 |
| 112 | 2.00 | 40 | 50 | 0.9 | 0 | 10 |
| 113* | 1.50 | 10 | 85 | 0.4 | 5 | 0 |
| 114* | 2.00 | 5 | 75 | 0.6 | 10 | 10 |
| 115* | 1.20 | 20 | 55 | 0.5 | 25 | 0 |
| 116* | 1.00 | 45 | 40 | 0.8 | 0 | 15 |
| 117* | 0.80 | 50 | 45 | 0.7 | 5 | 0 |
| 118 | 1.20 | 25 | 75 | 0.9 | 0 | 0 |
| 119* | 1.50 | 25 | 75 | 1.0 | 0 | 0 |
| 120 | 1.00 | 35 | 65 | 0.9 | 0 | 0 |

TABLE 4-continued

| Sample No. | Amount Glass Added (wt. %) | Components of Oxide Glass | | | | |
|---|---|---|---|---|---|---|
| | | Li$_2$O | (Si$_2$Ti$_{1-w}$) | W | Al$_2$O$_3$ | ZrO$_2$ |
| 121* | 1.50 | 35 | 65 | 1.0 | 0 | 0 |
| 122* | 1.20 | 20 | 70 | 0.2 | 0 | 10 |

*Samples with * are outside the invention

The electric characteristics of these samples were measured. The capacitance (C) and the dielectric loss (tan δ) were measured using an automatic bridge-type meter at a frequency of 1 KHz, at 1 V rms and at 25° C. From the capacitance thus measured, obtained was the dielectric constant (ε) of each sample through calculation. Next, to measure the insulating resistance (R) of each sample, a direct current voltage of 16 V or 160 V was applied to each sample at 25° C. or 125° C. for 2 minutes using an insulating resistance meter. After having thus measured the insulating resistance (R) of each sample, the product of the capacitance (C) and the insulating resistance (R) or, that is, the product CR, of each sample was obtained. In addition, the temperature-dependent variation in the capacitance of each sample was determined.

For the temperature-dependent variation in the capacitance, obtained were the variation in the capacitance between −25° C. and 85° C. based on the capacitance at 20° C. (ΔC/C$_{20}$), the variation in the capacitance between −55° C. and 125° C. based on the capacitance at 25° C. (ΔC/C$_{25}$), and the maximum variation, in terms of the absolute value, between −55° C. and 125° C. (\ΔC\max).

To determine the high-temperature load life of each sample, 36 pieces of each sample were subjected to a high-temperature load test in which a direct current voltage of 100 V was applied to each piece at 150° C. while measuring the insulating resistance of each test piece which varied time-dependently. In this test, the period of time within which the insulating resistance value (R) of each piece being tested reached 10$^6$ Ω or lower was measured, and is referred to as the life time of each test piece. The average of all the tested pieces was calculated to obtain the average life time of each sample. To determine the high-humidity load life of each sample, 72 pieces of each sample were subjected to a high-humidity load test in which a direct current voltage of 16 V was applied to each piece under a pressure of 2 atmospheres at a relative humidity of 100% and at a temperature of 121° C. while measuring the insulating resistance of each test piece which varied time-dependently. In this test, the number of the tested pieces that showed an insulating resistance (R) of 10$^6$ Ω or lower within a period of 250 hours was counted.

The results obtained in these tests are shown in Table 5.

TABLE 5

| Sample No. | Baking Temperature (°C.) | Dielectric Constant ε | Dielectric Loss tan δ% | Temperature-Dependent Variation in Capacitance ΔC/C$_{20}$ % | | Temperature-Dependent Variation in Capacitance ΔC/C$_{25}$ % | | | Product of CR (25° C.) (Ω·F) | | Product of CR (125° C.) (Ω·F) | | Mean Life Time (hr.) | Number of Failures in high-humidity Load Test |
|---|---|---|---|---|---|---|---|---|---|---|---|---|---|---|
| | | | | −25° C. | 85° C. | −55° C. | 125° C. | max | 16 V | 160 V | 16 V | 160 V | | |
| 101 | 1300 | 3210 | 1.7 | −0.2 | −8.5 | −0.86 | −10.5 | 12.0 | 6740 | 2360 | 2090 | 610 | 529 | 0/72 |
| 102 | 1300 | 3350 | 2.0 | 0.1 | −8.9 | −0.2 | −11.2 | 11.2 | 7040 | 2460 | 2180 | 630 | 524 | 0/72 |
| 103 | 1300 | 3160 | 1.6 | −0.32 | −7.8 | −0.7 | −9.9 | 10.0 | 6600 | 2310 | 2050 | 590 | 607 | 0/72 |
| 104 | 1280 | 3280 | 1.7 | 0.2 | −8.5 | −0.1 | −10.8 | 11.5 | 6890 | 2410 | 2130 | 540 | 633 | 0/72 |
| 105 | 1260 | 3010 | 1.5 | −0.8 | −5.9 | −1.5 | −7.8 | 8.2 | 6320 | 2210 | 2030 | 520 | 581 | 0/72 |
| 106 | 1260 | 3060 | 1.5 | −0.7 | −6.8 | −1.2 | −8.5 | 9.0 | 6420 | 2250 | 2240 | 640 | 580 | 0/72 |
| 107 | 1300 | 3100 | 1.6 | −0.2 | −7.5 | −0.8 | −8.9 | 8.9 | 6510 | 2280 | 2020 | 590 | 600 | 0/72 |
| 108 | 1280 | 3250 | 1.7 | 0.1 | −7.9 | −0.2 | −9.5 | 10.0 | 6830 | 2390 | 2120 | 610 | 564 | 0/72 |
| 109 | 1280 | 3290 | 1.7 | 0.0 | −8.2 | −0.4 | −10.3 | 10.3 | 6910 | 2420 | 2140 | 530 | 539 | 0/72 |
| 110 | 1280 | 3330 | 1.9 | 0.1 | −9.2 | −0.2 | −11.6 | 12.0 | 6990 | 2450 | 2410 | 580 | 641 | 0/72 |
| 111 | 1280 | 3060 | 1.5 | −0.3 | −7.6 | −1.1 | −8.4 | 8.6 | 6430 | 2250 | 2180 | 640 | 591 | 0/72 |
| 112 | 1260 | 3430 | 2.0 | 1.1 | −8.9 | 0.5 | −13.1 | 13.1 | 7200 | 2520 | 2460 | 650 | 537 | 0/72 |
| *113 | 1350 | As the sample was sintered insufficiently, the measurement was impossible | | | | | | | | | | | | |
| *114 | 1350 | As the sample was sintered insufficiently, the measurement was impossible | | | | | | | | | | | | |
| *115 | 1350 | 3250 | 1.7 | 0.2 | −8.9 | −0.2 | −13.5 | 13.5 | 6540 | 2310 | 2230 | 531 | 510 | 22/72 |
| *116 | 1350 | As the sample was sintered insufficiently, the measurement was impossible | | | | | | | | | | | | |
| *117 | 1350 | As the sample was sintered insufficiently, the measurement was impossible | | | | | | | | | | | | |
| 118 | 1300 | 3120 | 1.7 | −0.4 | −8.6 | −1.1 | −10.5 | 10.5 | 7120 | 2490 | 2250 | 650 | 514 | 0/72 |
| *119 | 1350 | 3240 | 1.9 | 0.2 | −9.1 | −0.1 | −12.5 | 13.0 | 6480 | 2270 | 2190 | 560 | 536 | 6/72 |
| 120 | 1300 | 3260 | 1.9 | −0.3 | −8.2 | −0.9 | −9.6 | 9.8 | 6540 | 2290 | 2080 | 540 | 587 | 0/72 |
| *121 | 1350 | 3100 | 2.0 | 0.3 | −9.5 | 0.1 | −13.5 | 13.5 | 6040 | 2110 | 2030 | 610 | 547 | 12/72 |
| *122 | 1350 | 3040 | 1.8 | 0.1 | −8.7 | −0.2 | −12.4 | 12.4 | 6110 | 2200 | 2190 | 520 | 603 | 7/72 |

Samples with * are outside the invention

As is obvious from Table 4 and Table 5, the monolithic capacitor samples comprising dielectric ceramic layers to which was added oxide glass in an amount falling within the scope of the present invention were all found to have a high dielectric constant of not lower than 3,000, and have a dielectric loss tangent, tan δ, of not larger than 2.5%, while satisfying the X7R-level characteristic standard stipulated in the EIA Standard within the temperature range between −55° C. and 125° C. with respect to the temperature-dependent variation in the capacitance.

Moreover, these samples of the invention were found to have high insulating resistance values, when measured at 25° C. and at 16 V and 160 V, of not smaller than 6,000 Ω·F and not smaller than 2,000 Ω·F, respectively, in terms of the product CR. These also had high insulating resistance values, when measured at 125° C. and at 16 V and 160 V, of not smaller than 2,000 Ω·F and not smaller than 500 Ω·F, respectively, in terms of the product CR. Further, these were found to have a long mean life time of not shorter than 500 hours, and in addition, no failure was found in the high-humidity load test. Moreover, these were sintered at relatively low temperatures of not higher than 1300° C.

Figure 4:
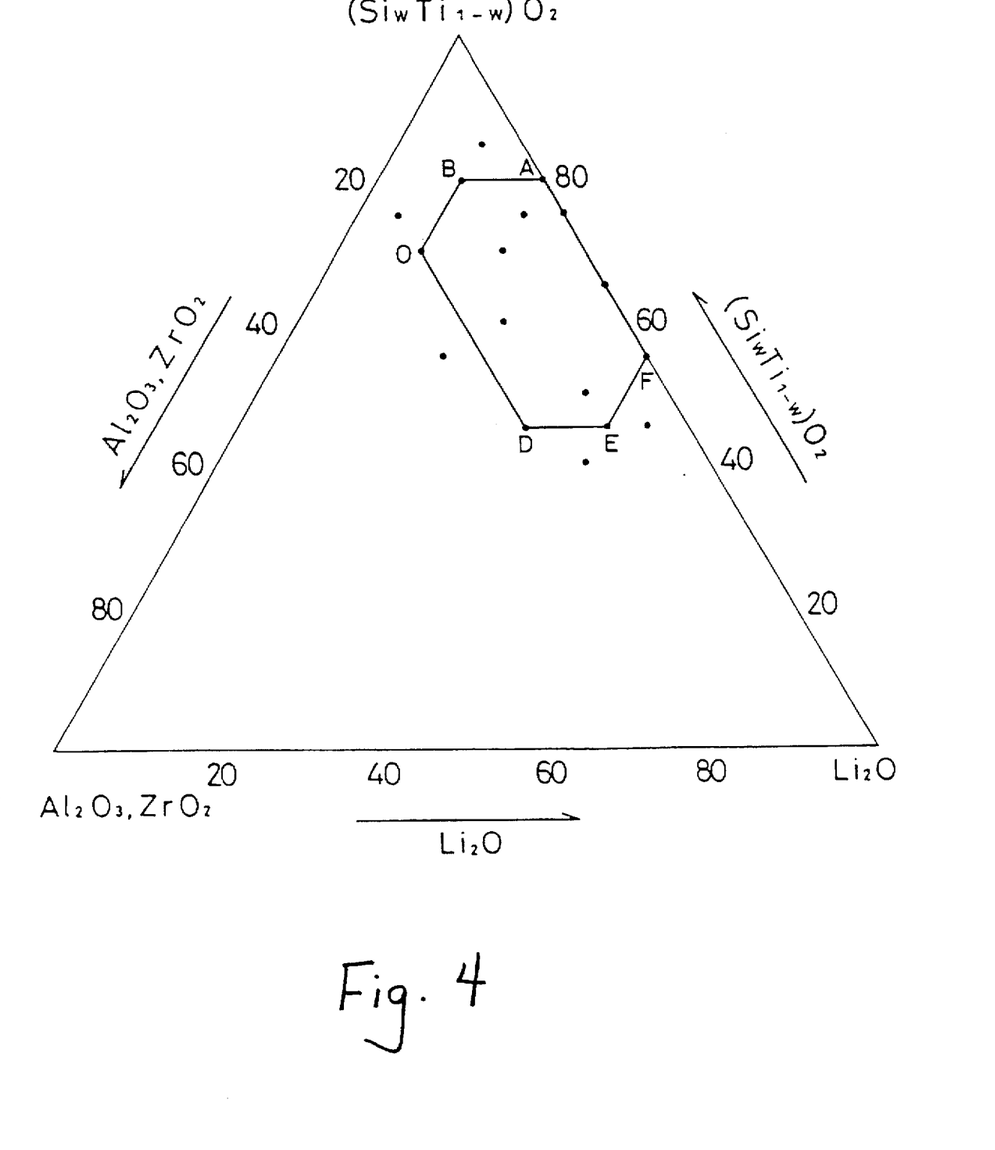
FIG. 4 is a three-component compositional graph for {Li$_2$O, (Si$_w$Ti$_{1-w}$)O$_2$, M} where M is at least one selected from Al$_2$O$_3$ and ZrO$_2$, which indicates the compositional range of the oxide additive Li$_2$O—(Si,Ti)O$_2$—Al$_2$O$_3$—ZrO$_2$.

In particular, the Li$_2$O—(Si.Ti)O$_2$—Al$_2$O$_3$—ZrO$_2$ oxide in the capacitor of the present invention is defined to fall within a compositional range as surrounded by six points, A, B, C, D, E, F, which are as follows, in a triangular diagram of {Li$_2$O, (Si$_w$Ti$_{1-w}$)O$_2$, M} shown in FIG. 4, in which 0.30≦w≦1.0, and M is at least one selected from Al$_2$O$_3$ and ZrO$_2$. In FIG. 4, the point A indicates a composition comprising 20% of Li$_2$O, 80% of (Si.Ti)O$_2$, and 0% of M; the point B indicates a composition comprising 10% of Li$_2$O, 80% of (Si.Ti)O$_2$, and 10% of M; the point C indicates a composition comprising 10% of Li$_2$O, 70% of (Si.Ti)O$_2$, and 20% of M; the point D indicates a composition comprising 35% of Li$_2$O, 45% of (Si.Ti)O$_2$, and 20% of M; the point E indicates a composition comprising 45% of Li$_2$O, 45% of (Si.Ti)O$_2$, and 10% of M; and the point F indicates a composition comprising 45% of Li$_2$O, 55% of (Si.Ti)O$_2$, and 0% of M. This is because if the oxide composition is outside the defined range, the sinterability of the ceramic layers is very poor, as seen in Sample Nos. 113 to 117, and even if the ceramic layers could be sintered, many capacitor samples failed in the high-moisture load test. However, even though falling within the defined range as surrounded by such six lines, if w=1.0 on the lines A–F, such is unfavorable since the sintering temperature is high, and many capacitor samples failed in the high-moisture load test, as in Sample Nos. 119 and 121. On the other hand, if the value, w, is less than 0.30, such is also unfavorable, since the sintering temperature is high, and many capacitor samples failed in the high-moisture load test, as in Sample No. 122.

In the above-mentioned examples, used was a powder of barium titanate as prepared according to the oxalic acid method, but this is not limitative. Apart from this, also employable are powders of barium titanate as prepared according to the alkoxide method or the hydrothermal reaction method. If the latter powders are used, the characteristics of the capacitors may often be improved more than those of the samples as demonstrated in these examples herein. Powders of yttrium oxide, cobalt oxide, nickel oxide and others were used in these examples, but these also are not limitative. Solutions of alkoxides or organic metal compounds for such oxides can also be employed in place of such oxide powders without interfering with the characteristics of the capacitors produced, provided that they are formulated to constitute the dielectric ceramic layers falling within the scope of the present invention.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor composed of
   a plurality of dielectric ceramic layers,
   a plurality of inner electrodes each of which is disposed between a pair of adjacent dielectric ceramic layers and arranged in such a manner that one end of each inner electrode is exposed out of an end of the dielectric ceramic layers, and
   outer electrode electrically connected with an exposed inner electrode,
   the monolithic ceramic capacitor being characterized in that
   the dielectric ceramic layers comprise a barium titanate having a content of alkali metal oxide impurities of about 0.02% by weight or less, and having the compositional formula:

where
   Re$_2$O$_3$ is one or more selected from Gd$_2$O$_3$, Tb$_2$O$_3$ and Dy$_2$O$_3$;
   M$_2$O$_3$ is one or more selected from Sc$_2$O$_3$ and Y$_2$O$_3$ and
   α, β, m, x, y and z are as follows:
   0.0025≦α≦0.025
   0.0025≦β≦0.05
   β/α≦4
   0<x≦0.50
   0≦y<1.0
   0≦z<1.0
   0≦y+z<1.0
   1.000<m≦1.035;
   magnesium oxide in an amount of from about 0.5 to 5.0 mols, in terms of MgO relative to 100 mols of the titanate, and
   from 0.2 to 3.0 parts by weight, relative to 100 parts by weight of said titanate and magnesium oxide of a Li$_2$O—(Si.Ti)O$_2$—Al$_2$O$_3$—ZrO$_2$ oxide; and
   wherein the inner electrodes comprise nickel or a nickel alloy.

2. The monolithic ceramic capacitor as claimed in claim 1, wherein the Li$_2$O—(Si.Ti)O$_2$—Al$_2$O$_3$—ZrO$_2$ oxide falls within the compositional range surrounded by six lines formed by connecting the six points, representing mol %, of:
   A (20, 80, 0)
   B (10, 80, 10)
   C (10, 70, 20)
   D (35, 45, 20)
   E (45, 45, 10)
   F (45, 55, 0)
in a triangular diagram of {Li$_2$O, (Si$_w$Ti$_{1-w}$)O$_2$, M}, in which 0.30≦w≦1.0, and M is at least one member selected from the group consisting of Al$_2$O$_3$ and ZrO$_2$, and provided that w<1.0 for a composition on the line A–F.

3. The monolithic ceramic capacitor as claimed in claim 2, wherein the impurities are less than about 0.015%, 0.004≦α≦0.02, 0.009≦β≦0.04, β/α≦2, x is abut 0.1–0.4, y is about 0.1–0.8, z is about 0.3–0.8, y+z is about 0.3–0.8, m is about 1.01–1.035, 0.4≦w>0.9, and said Li$_2$O—(Si.Ti)O$_2$—Al$_2$O$_3$—ZrO$_2$ oxide is about 0.8–2 parts.

4. The monolithic ceramic capacitor as claimed in claim 3 having two separate outer electrodes on the outside surface of the capacitor, each of which is electrically connected to an inner electrode.

5. The monolithic ceramic capacitor as claimed in claim 4, wherein the outer electrodes comprise a sintered layer of an electroconductive metal powder optionally containing a glass frit.

6. The monolithic ceramic capacitor as claimed in claim 5, wherein the outer electrodes are composed of a first sintered layer of an electroconductive metal powder optionally containing a glass frit added thereto, and a second plated layer formed on the first layer.

7. The monolithic ceramic capacitor as claimed in claim 2, having two separate outer electrodes on the outside surface of the capacitor, each of which is electrically connected to an inner electrode.

8. The monolithic ceramic capacitor as claimed in claim 7, wherein the outer electrodes comprise a sintered layer of an electroconductive metal powder optionally containing a glass frit.

9. The monolithic ceramic capacitor as claimed in claim 8, wherein the outer electrodes are composed of a first sintered layer of an electroconductive metal powder optionally containing a glass frit added thereto, and a second plated layer formed on the first layer.

10. The monolithic ceramic capacitor as claimed in claim 1 having two separate outer electrodes on the outside surface of the capacitor, each of which is electrically connected to an inner electrode.

11. The monolithic ceramic capacitor as claimed in claim 10, wherein the outer electrodes comprise a sintered layer of an electroconductive metal powder optionally containing a glass frit.

12. The monolithic ceramic capacitor as claimed in claim 11, wherein the outer electrodes are composed of a first sintered layer of an electroconductive metal powder optionally containing a glass frit added thereto, and a second plated layer formed on the first layer.

* * * * *